United States Patent [19]

Nozaki et al.

[11] Patent Number: 5,310,848

[45] Date of Patent: May 10, 1994

[54] RESIN COMPOSITION FOR POWDER COATING

[75] Inventors: Tokuzo Nozaki; Katsuyoshi Atsumi; Makiko Sakai, all of Aichi, Japan

[73] Assignee: Nippon Ester Co., Ltd., Aichi, Japan

[21] Appl. No.: 10,763

[22] Filed: Jan. 29, 1993

[30] Foreign Application Priority Data

Jan. 29, 1992 [JP] Japan .................. 4-038552

[51] Int. Cl.$^5$ .................. C08G 18/30; C08G 18/80
[52] U.S. Cl. .................. 528/45; 524/196; 524/539; 525/187; 525/440; 525/445; 528/80; 528/83; 528/283
[58] Field of Search .................. 524/539, 196; 528/45, 528/80, 83; 525/440

[56] References Cited

U.S. PATENT DOCUMENTS

| | | | |
|---|---|---|---|
| 4,354,014 | 10/1982 | Wolf et al. | 528/45 |
| 4,649,067 | 3/1987 | Gras | 528/45 |
| 5,089,553 | 2/1992 | Umeda et al. | 524/539 |
| 5,212,243 | 5/1993 | Toyoda et al. | 525/187 |

FOREIGN PATENT DOCUMENTS 641770 1/1989 Japan .

OTHER PUBLICATIONS

IPDI-BF 1540, "Cross-Linking agent free from blocking agent for saturated polyesters containing OH groups", published by Huls Company.

Primary Examiner—Paul R. Michl
Assistant Examiner—Olga Asinovsky
Attorney, Agent, or Firm—Sughrue, Mion, Zinn, Macpeak & Seas

[57] ABSTRACT a resin composition for a powder coating comprising a polyester A, which does not substantially set to gel and has a hydroxyl value of at least 1,200 g eq/$10^6$ g, a polyester B, which does not substantially set to gel and has a hydroxyl value of from 200 to 1,000 g eq/$10^6$ g, and an inner blocked isocyanate hardener, wherein the weight ratio of polyester A to polyester B is from 70:30 to 10:90 and the difference (absolute value) in gel time between these polyesters A and B is at least 3 minutes.

6 Claims, No Drawings

RESIN COMPOSITION FOR POWDER COATING

FIELD OF THE INVENTION

The present invention relates to a resin composition for a powder coating capable of giving a mat or semimat coating film.

BACKGROUND OF THE INVENTION

Common examples of powder coatings include epoxy-series, acryl-series and polyester-series. It is well known that polyester-series powder coatings have well-balanced coating performance.

Powder coatings have been widely used in various fields including appliance, automobile and construction materials. In some cases, a glossy coated surface (specular gloss at 60°: approximately 90 to 100%) is required for aesthetic purposes, while a mat (specular gloss at 60°: approximately less than 30%) or semimat (specular gloss at 60°: approximately 30 to 70%) may be required for other purposes.

Examples of conventional methods for preparing a powder coating capable of giving such a mat or semimat coating film include a method comprising adding a large amount of a pigment of coarse particles, and another method comprising dry-blending a polyester-series powder coating with an acryl-series powder coating.

However, the addition of a large amount of a pigment of coarse particles causes a deterioration in smoothness or a decrease in mechanical strength of the coating film. On the other hand, when using the method of dry-blending the two powder coatings, a mat or semimat powder coating cannot be obtained by a single step, which increases production cost. Furthermore, this method suffers from other problems including heterogeneity of the resulting blend and a change in the blending ratio during recovery and application.

In order to solve the above-mentioned problems, JP-A-64-1770 (the term "JP-A" as used herein means an "unexamined published Japanese patent application") proposes a resin composition for a powder coating comprising a polyester having a hydroxyl value of at least 1,200 g eq/$10^6$ g, another polyester having a hydroxyl value of from 200 to 1,000 g eq/$10^6$ g and a blocked isocyanate hardener wherein the difference in gel time between the two polyesters is at least 3 minutes.

In the case of a powder coating comprising this resin composition for a powder coating, however, a large amount of a di- or tri-functional blocked isocyanate hardener should be blended in order to control the functional value to a level almost equivalent with the hydroxyl value, since a polyester having a hydroxyl value of at least 1,200 g eq/$10^6$ g is contained therein. As a result, there occur some troubles, for example, contamination of a stove or a material to be coated due to vaporization of a large amount of a blocking agent during the reaction between the polyester and the blocked isocyanate hardener and a weight loss of 10% or above.

SUMMARY OF THE INVENTION

An object of the present invention is to solve the above-mentioned problems by providing a resin composition for a powder coating whereby a stable mat or semimat coating film can be obtained without causing a trouble of the contamination of a stove or a material to be coated and with a small weight loss during the reaction.

As a result of extensive studies, the present inventors have found that the above-mentioned object can be achieved by combining two types of polyesters each having a specific hydroxyl value with an inner blocked isocyanate hardener accompanied by no vaporization of a blocking agent during the hardening reaction, thus completing the present invention.

Accordingly, the present invention provides a resin composition for a powder coating comprising a polyester A, which does not substantially set to gel and has a hydroxyl value of at least 1,200 g eq/$10^6$ g, a polyester B, which does not substantially set to gel and has a hydroxyl value of from 200 to 1,000 g eq/$10^6$ g, and an inner blocked isocyanate hardener, wherein the composition ratio (by weight) of polyester A to polyester B is from 70:30 to 10:90 and the difference (absolute value) in gel time between polyester A and polyester B is at least 3 minutes.

DETAILED DESCRIPTION OF THE INVENTION

In the present invention, a hydroxyl value and a gel time are each a value determined by the method as specified below.

Hydroxyl Value

Determined by acetylating a polyester sample and then titrating with a solution of potassium hydroxide in methanol.

Gel Time

To a polyester sample, there are added an inner blocked isocyanate hardener (IPDI-BF 1540, manufactured by Hüls Co.), in such an amount that functional groups become equivalent, and 33% by weight of a titanium dioxide powder. Then the hardening curve of 90 g of the obtained sample is formed by using a Brabender Plasti-Corder (manufactured by Brabender Co.) at a temperature of 200° C. The time to inflection point is referred to herein as the "gel time".

In the present invention, the expression "inner blocked isocyanate" means a compound which has the following bond consisting of self-blocked isocyanate groups but does not have the group which functions as an isocyanate group other than the self-blocked isocyanate groups:

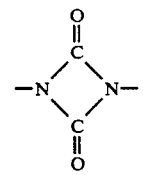

In the resin composition of the present invention, the hydroxyl value of polyester A should be at least 1,200 g eq/$10^6$ g, preferably from 2,000 to 5,000 g eq/$10^6$ g, while that of polyester B should be from 200 to 1,000 g eq/$10^6$ g. When the hydroxyl value of polyester A is less than 1,200 g eq/$10^6$ g, a good matting effect cannot be achieved. When the hydroxyl value of polyester B is less than 200 g eq/$10^6$ g, the surface of the coating film suffers from significant unevenness, and therefore the smoothness thereof is deteriorated. When the hydroxyl value of polyester B exceeds 1,000 g eq/$10^6$ g, on the other hand, the mechanical strength of the coating film is deteriorated or only a poor matting effect is achieved.

It is required that both of polyesters A and B are polyesters which do not substantially set to gel. The expression "polyester which does not substantially set to gel" as used herein means a polyester which can be ground with the use of a common mill and is flowable when melted. When a polyester has set to gel, it is difficult to formulate the resin composition into a coating and, furthermore, the obtained coating film fails to give an even surface.

In the present invention, an inner blocked isocyanate hardener is to be used as a hardener. The inner blocked isocyanate hardener, in which isocyanate groups have been self-blocked, contains no blocking agent. Therefore, it never suffers from any troubles such as the contamination of a stove or weight loss due to the vaporization of a blocking agent during the hardening reaction. As an example of such a hardener, uretdione-bound self-blocked isophorone diisocyanate, which is marketed from Hüls Co. under a tradename "IPDI-BF 1540", may be cited.

It is preferable to use the hardener in such an amount that equivalency of the number of its functional groups to the number of hydroxy groups in the polyester resins is from 0.8 to 1.2.

In the resin composition of the present invention, the composition ratio (by weight) of polyester A to polyester B is from 70:30 to 10:90, preferably from 40:60 to 20:80. When the composition ratio does not fall within the broader range, a satisfactory matting effect cannot be achieved.

In the resin composition of the present invention, the difference (absolute value) in gel time between polyesters A and B should be at least 3 minutes. When said difference in gel time is shorter than 3 minutes, a sufficient matting effect cannot be achieved. In order to obtain a highly mat coated film (specular gloss at 60°: less than 20%), it is preferable that said difference is from 5 to 15 minutes. When the difference in gel time of polyester resins to be used does not fall within this range, only an unsatisfactory matting effect is achieved or the mechanical strength of the coating film is deteriorated.

In the present invention, the degree of matting can be controlled by adjusting the hydroxyl value of polyester A, the weight ratio of polyesters A and B, and the difference in gel time between these polyesters. When the hydroxyl value of polyester A is approximately 3,000 g eq/$10^6$ g or above and the weight ratio of polyester A to polyester B is 30:70, for example, a completely mat coated face (specular gloss at 60°: less than 10%), a mat coated face (specular gloss at 60°: approximately 20%) and a semimat coated face (specular gloss at 60°: 50 to 60%) can be obtained by adjusting the difference in gel time between these polyesters to at least 6 minutes, approximately 5 minutes and approximately 3 to 4 minutes, respectively.

In the resin composition of the present invention, it is preferable to control the difference (absolute value) in acid value between polyesters A and B to at least 20 g eq/$10^6$ g. When the difference in acid value between these polyesters is excessively small, the specular gloss at 60° of a coated face varies within a range of from several percent to 50% especially when a completely mat coated surface of a specular gloss at 60° of 10% or less is to be formed, and, therefore, a mat coated face having a stable specular gloss cannot be obtained.

As polyester A, those obtained from the following carboxylic acid components and alcohol components may be preferably employed.

Carboxylic Acid Component

Materials comprising terephthalic acid and/or isophthalic acid optionally together with other polyvalent carboxylic acids such as aromatic dicarboxylic acids (for example, 2,6-naphthalenedicarboxylic acid), aliphatic dicarboxylic acids (for example, succinic acid, adipic acid, azelaic acid), alicyclic dicarboxylic acids (for example, 1,4-cyclohexanedicarboxylic acid) and a small amount of tri- or higher valent carboxylic acids (for example, trimellitic acid, pyromellitic acid).

Alcohol Component

Materials comprising trifunctional alcohols such as trimethylolethane, trimethylolpropane, 3-methylpentane-1,3,5-triol and glycerol optionally together with bifunctional alcohols (for example, aliphatic glycols such as ethylene glycol, diethylene glycol, 1,2-propanediol, and neopentyl glycol) and a small amount of tetrafunctional alcohols (for example, pentaerythritol).

As polyester B, those obtained from the following carboxylic acid components and alcohol components may be preferably employed.

Carboxylic Acid Component

Materials comprising terephthalic acid and/or isophthalic acid optionally together with other polyvalent carboxylic acids such as aromatic dicarboxylic acids (for example, 2,6-naphthalenedicarboxylic acid), a small amount of tri- or higher valent aromatic carboxylic acids (for example, trimellitic acid, pyromellitic acid), aliphatic dicarboxylic acids (for example, succinic acid, adipic acid, azelaic acid) and alicyclic dicarboxylic acids (for example, 1,4-cyclohexanedicarboxylic acid).

Alcohol Component

Materials comprising ethylene glycol and neopentyl glycol optionally together with aliphatic glycols (for example, diethylene glycol, 1,2-propanediol) and a small amount of tri- or higher valent alcohols (for example, trimethylolpropane, pentaerythritol).

The average degrees of polymerization of polyesters A and B may preferably be from 4 to 50, since such a polyester can be easily powdered.

Furthermore, the softening points of polyesters A and B may preferably be from 50 to 150° C. When the softening point of a polyester is lower than 50° C., the powdered resin is liable to be solidified through aggregation, and thus the blocking resistance of the coating is deteriorated. When the softening point exceeds 150° C., on the other hand, it is necessary to employ an elevated kneading temperature. As a result, the reaction of the resin composition with the hardener would proceed during the formulation of the coating, and therefore the smoothness and mechanical strength of the obtained coating film are deteriorated.

The resin composition for a powder coating according to the present invention may be produced by kneading the above-mentioned polyesters A and B and the hardener by using a kneader or a roller at a temperature of from 70° to 150° C.

The resin composition of the present invention may further contain other additives (for example, leveling agents, hardening catalysts), if required.

To further illustrate the present invention in greater detail, the following Examples and Comparative Examples will be given.

The characteristic data were determined by the following methods.

Average Degree of Polymerization

Determined by gel permeation chromatography.

Hydroxyl Value

Determined by the above-mentioned method.

Acid Value

Determined by dissolving a sample in dioxane and then titrating with a solution of potassium hydroxide in methanol.

Softening Point

Determined by heating a sample on a hot bench and then observing with the naked eye.

Gel Time

Determined by the above-mentioned method.

Specular Gloss at 60°

Determined in accordance with JIS K 5400.

Impact Resistance

In accordance with JIS K 5400, determined by using a ball (diameter: ½in., weight: 500 g).

Weight Loss

The ratio of the difference in weight before and after the hardening reaction to the weight before the reaction was determined.

REFERENCE EXAMPLE 1

Preparation of Polyester A

The compounds as specified in Table 1 were introduced into a stainless reaction vessel provided with stirring blades and heated to 230° C. under stirring. The water thus formed was continuously removed from the reaction system. After keeping the reaction mixture under the reduced pressure of 600 mmHg for 3 hours, the compound as specified in Table 2 was added thereto. The mixture was stirred in a closed system for 1 hour to thereby obtain a polyester resin 1.

REFERENCE EXAMPLE 2

Preparation of Polyester A

The compounds as specified in Table 1 were introduced into a stainless reaction vessel provided with stirring blades and heated to 230° C. under stirring. The water thus formed was continuously removed from the reaction system. After keeping the reaction mixture under the reduced pressure of 600 mmHg for 3 hours, a polyester resin 2 was obtained.

REFERENCE EXAMPLE 3-5

Preparation of Polyester B

The compounds as specified in Table 1 were introduced into a stainless reaction vessel provided with stirring blades and heated to 260° C. under stirring. The water thus formed was continuously removed from the reaction system. Next, 5.84 parts by weight of antimony trioxide were added thereto as a polycondensation catalyst. Then the obtained mixture was subjected to a polycondensation reaction at 280° C. for 2 hours under reduced pressure of 1.0 to 0.5 mmHg or below to thereby obtain a polyester resin having a high degree of polymerization. After cooling to 270° C., the compound as specified in Table 2 was added to the obtained resin. After depolymerizing in a closed system, polyester resins 3 to 5 were obtained.

Table 3 shows the characteristic data of each polyester resin.

TABLE 1

| | Reference Example | | | | |
|---|---|---|---|---|---|
| | 1 | 2 | 3 | 4 | 5 |
| terephthalic acid | 3320 | | 16600 | 16600 | 16600 |
| isophthalic acid | 13280 | 17000 | | | |
| ethylene glycol | | | 3100 | 3720 | 5890 |
| neopentyl glycol | 520 | 11440 | 10400 | 6760 | |
| bisphenol S ethylene oxide | | 3380 | | | |
| trimethylolpropane | 15810 | 15410 | | | |

(parts by weight)

TABLE 2

| | Reference Example | | | |
|---|---|---|---|---|
| | 1 | 3 | 4 | 5 |
| isophthalic acid | 230 | | | |
| neopentyl glycol | | | 100 | |
| trimethylolpropane | | 540 | 670 | 540 |

(parts by weight)

TABLE 3

| | Polyester | | | | |
|---|---|---|---|---|---|
| | 1 | 2 | 3 | 4 | 5 |
| average degree of polymerization | 4.6 | 5.2 | 25.3 | 16.2 | 25.5 |
| hydroxyl value (g eq/$10^6$ g) | 4810 | 4370 | 500 | 730 | 540 |
| acid value (g eq/$10^6$ g) | 64 | 43 | 9 | 10 | 10 |
| softening point (°C.) | 70 | 78 | 89 | 80 | 85 |
| gel time (min.) | 4.1 (4.4) | 4.2 (4.4) | 12.0 (12.8) | 9.5 (10.2) | 8.4 |

Data given in parentheses are obtained by using a hardener B 1530.

EXAMPLES 1 TO 4 AND COMPARATIVE EXAMPLES 1 to 4

Each polyester resin as specified in Table 4, a hardener (IPDI-BF 1540 manufactured by Hüls Co.; inner blocked isocyanate or B 1530 manufactured by Hüls Co.: ε-caprolactam blocked isocyanate), a leveling agent (Acronal 4F manufactured by BASF Co.), benzoin, a hardening catalyst (Stann OMF manufactured by Sankyo Yuki Gosei K.K.), an epoxy resin (Epo Tohto YD 014 manufactured by Tohto Kasei K.K.), titanium dioxide and precipitated barium sulfate were dry-blended at the ratio as specified in Table 4 in a Henschel mixer (FM 10B manufactured by Mitsui Miike Seisakusho K.K.) and then kneaded in a molten state in a Ko-kneader (PR-46 manufactured by Buss Co.) at a temperature of 90 to 110° C. After cooling and grinding, the product was passed through a wire mesh (140 mesh) to thereby obtain a powder coating.

The powder coating thus obtained was electrostatically applied onto a steel plate treated with zinc phosphate in such a manner as to provide a film thickness of 50 to 60 μm followed by baking at 200° C. for 20 minutes.

Table 5 shows the results of the evaluation of the film properties.

TABLE 4

| | Example | | | | Comparative Example | | | |
|---|---|---|---|---|---|---|---|---|
| | 1 | 2 | 3 | 4 | 1 | 2 | 3 | 4 |
| polyester resin 1 | | | 24 | 26 | | 24 | | |
| polyester resin 2 | 15 | 20 | | | 15 | | 40 | |
| polyester resin 3 | 54 | | | 31 | 54 | | 10 | |
| polyester resin 4 | | | 36 | | | 36 | | 42 |
| polyester resin 5 | | 48 | | | | | | 42 |
| hardener BF 1540 | 31 | 32 | 40 | 43 | | | 50 | 16 |
| hardener B 1530 | | | | | 31 | 40 | | |
| leveling agent | 1 | 1 | 1 | 1 | 1 | 1 | 1 | 1 |
| benzoin | 0.5 | 0.5 | 0.5 | 0.5 | 0.5 | 0.5 | 0.5 | 0.5 |
| hardening catalyst | | | 0.3 | | | 0.3 | | |
| epoxy resin | | | 2 | | | 2 | | |
| titanium dioxide | 50 | 50 | 35 | 50 | 50 | 35 | 50 | 50 |
| barium sulfate | | | 15 | | | 15 | | |

(parts by weight)

TABLE 5

| | Example | | | | Comparative Example | | | |
|---|---|---|---|---|---|---|---|---|
| | 1 | 2 | 3 | 4 | 1 | 2 | 3 | 4 |
| difference in gel time (min.) | 7.8 | 4.2 | 5.4 | 7.9 | 8.4 | 5.8 | 7.8 | 1.1 |
| specular gloss at 60° (%) | 9.5 | 40.3 | 57.5 | 38.8 | 4.1 | 28.3 | 83.3 | 88.1 |
| impact resistance (cm) | >50 | 40 | 40 | >50 | 40 | >50 | 20 | >50 |
| weight loss (%) | 1.2 | 1.5 | 1.4 | 1.6 | 14.6 | 18.5 | 2.1 | 1.6 |

According to the present invention, a resin composition for a powder coating capable of providing a stable mat or semimat coating film which is excellent in mechanical strength which is accompanied by no vaporization of a blocking agent with a small weight loss during the reaction can be obtained.

While the invention has been described in detail and with reference to specific embodiments thereof, it will be apparent to one skilled in the art that various changes and modifications can be made therein without departing from the spirit and scope thereof.

What is claimed is:

1. A resin composition for a powder coating comprising a polyester A which does not substantially set to gel and has a hydroxyl value of at least 1,200 g eq/10⁶ g, a polyester B which does not substantially set to gel and has a hydroxyl value of from 200 to 1,000 g eq/10⁶ g, and an inner blocked isocyanate hardener, containing, self-blocked isocyanate groups of the formula:

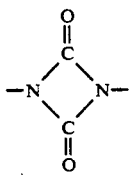

wherein the weight ratio of said polyester A to said polyester B is 70:30 to 10:90 and the difference (absolute value) in gel time between said polyester A and said polyester B is at least 3 minutes.

2. A resin composition for a powder coating as in claim 1, wherein said polyester A is a polyester comprising terephthalic acid and/or isophthalic acid with trimethylolpropane and said polyester B is a polyester comprising terephthalic acid and/or isophthalic acid with ethylene glycol and/or neopentyl glycol.

3. A resin composition for a powder coating as in claim 1, wherein the difference (absolute value) in acid value between said polyester A and said polyester B is at least 20 g eq/10⁶ g.

4. A resin composition for a powder coating as in claim 1, wherein the hydroxy value of said polyester A is from 2,000 to 5,000 g eq/10⁶ g.

5. A resin composition for a powder coating as in claim 1, wherein the difference (absolute value) in gel time between said polyester A and said polyester B is from 5 to 15 minutes.

6. A resin composition for a powder coating as in claim 1, wherein the softening points of said polyester A and said polyester B are from 50 to 150° C.

* * * * *